Aug. 11, 1970  J. GERVAIS  3,524,034
ROTARY PULSE GENERATOR
Filed Sept. 5, 1968  2 Sheets-Sheet 1

INVENTOR
Jean GERVAIS

ATTORNEY

Aug. 11, 1970   J. GERVAIS   3,524,034
ROTARY PULSE GENERATOR
Filed Sept. 5, 1968   2 Sheets-Sheet 2

INVENTOR
Jean GERVAIS

ATTORNEY

United States Patent Office 3,524,034
Patented Aug. 11, 1970

3,524,034
ROTARY PULSE GENERATOR
Jean Gervais, Marcinelle, Belgium, assignor to Ateliers de Constructions Electriques de Charleroi (ACEC) Societe Anonyme, Charleroi, Belgium
Filed Sept. 5, 1968, Ser. No. 757,722
Claims priority, application Belgium, Sept. 19, 1967, 48,621; July 25, 1968, P 942
Int. Cl. H01h 3/16
U.S. Cl. 200—153                    8 Claims

ABSTRACT OF THE DISCLOSURE

This invention relates to a rotary pulse generator comprising a position index member and a second member responsive to the passing of the index member for generating a pulse operating a control circuit. A first guide means is provided for moving the index member in a direction perpendicular to an axis of rotation so as to gradually displace the index member axially with respect to the second member. A second guide means is provided for moving the index member in a direction parallel to the axis of rotation when the index member has been rotated a predetermined number of degrees to actuate the second member.

This invention relates to a rotary pulse generator.

Rotary pulse generators such as, for example, the device for detecting the passage of mobile elements disclosed in Belgian Pat. No. 519,731, and comprising a position index member, more particularly two ferromagnetic elements mounted on a rotatable shaft, and a second member responsive to the passing of the index member, which second member operates the circuit of a control apparatus which permits to stop the rotatable shaft at a predetermined position.

The invention concerns a rotary pulse generator permitting to obtain practically the same advantages as the one mentioned above, but in combination with a circuit which is simple and more robust. The generator in accordance with the invention may be used particularly as a reversible rotary limit switch or as a device for counting the number of revolutions of an apparatus subjected to frequent stops and to reversals of its direction of operation.

The invention is characterized by the fact that the position index member and the second member sensible to the passing of this index member are movable with respect to each other about an axis of rotation not only in the direction perpendicular to the axis of rotation, but also in the direction of the axis of rotation, and comprise a first guide means for moving the index member in a direction perpendicular to the axis of rotation so as to gradually displace the index member axially with respect to the second member, and a second guide means for moving the index member in a direction parallel to the axis of rotation when the index member has been rotated a predetermined number of degrees to actuate the second member.

The invention will now be disclosed with reference to the drawings illustrating two embodiments of the invention and in which.

Figure 1:
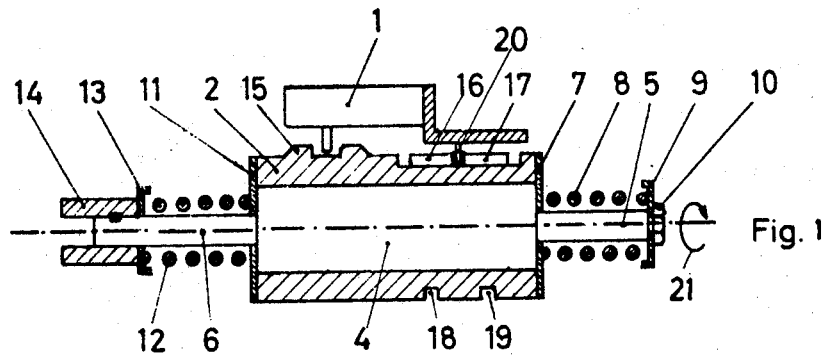
FIG. 1 illustrates a side view, in cross-section, of a first embodiment of the invention.

The rotary pulse generator comprises a control apparatus of which a single member responsive to the passing of a position index member, for example a contact 1, is shown. The contact may be operated by a cam 2 which, in the present embodiment, consists of a sleeve having a slot engaged by a ridge 3 of an arbor 4. The arbor 4 has two ends 5 and 6 which are of smaller cross section than the central portion thereof. On the end 5 there is positioned a first washer 7, a spring 8 and a second washer 9 which is held by means of a screw 10. On the end 6 there is a first washer 11, a spring 12 and a second washer 13 held in position by a coupling 14 which permits the device to be secured to the shaft of a mechanism not shown.

In FIG. 1, the device is shown at rest. It may be rotated in both directions with respect to contact 1 which is fixed. The sleeve or cam 2 comprises two projections 15 and a guiding path is engraved in the cylindrical surface of cam 2. The guiding path consists of two straight portions 16 and 17 which are parallel to the axis of the cam and two helices 18 and 19. An element adapted to slide in this guiding path, such as for example pin 20, is secured to contact 1. When arbor 4 rotates in the direction of the arrow 21, cam 2 rotates at the same time and, because of guiding path 18 in which pin 20 is engaged, the cam 2 moves to the right.

Figure 2:
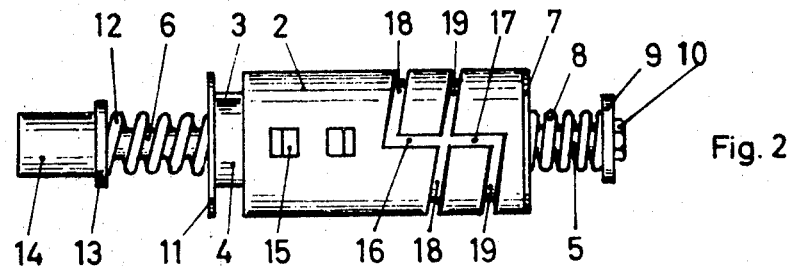
FIG. 2 illustrates a bottom view of the same embodiment rotated 180°.

FIG. 2 illustrates a bottom view of the device when arbor 4 has rotated 180° with respect to the position of FIG. 1. While spring 12 maintains washer 11 in position, cam 2 compresses spring 8.

Figure 3:
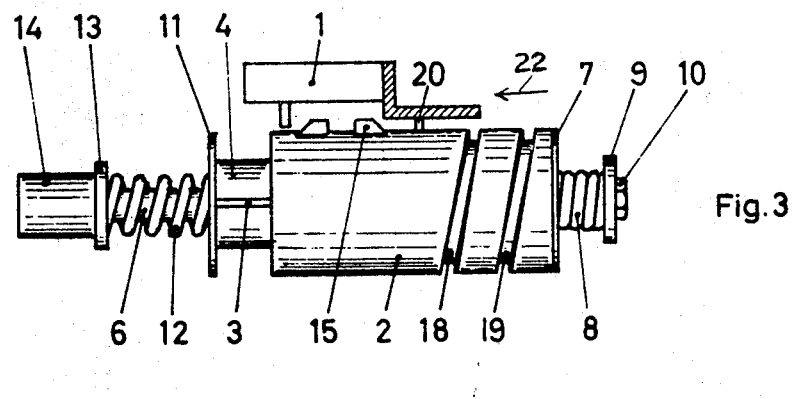
FIG. 3 illustrates a side view of the same embodiment rotated 360°.

FIG. 3 illustrates a side view of the device when arbor 4 has rotated a full revolution with respect to the position of FIG. 1. The spring 8 is completely compressed and pin 20 is positioned at the end of the portion 16 of the guiding path. The cam 2 is then moved in the direction of arrow 22 under the reaction of the spring 8 so that one of the projections 15 operates contact 1. After that, cam 2 is back to the position illustrated in FIG. 1. If, at this moment the mechanism continues to rotate a few degrees or oscillates around its limit position, this is not too important and does not influence contact 1 which is operated only when cam 2 is displaced parallel to its axis.

The mechanism may also be rotated in a direction opposite to the one indicated by arrow 21. In this case, pin 20 slides in helix portion 19 and returns by straight portion 17 of the guiding path. At this time, the contact 1 is operated by the other projection 15 on cam 2. Other variations are possible; for example, the guiding path may be located on a sleeve secured to contact 1 while cam 2 carries a pin. The two helices may cross each other and end up in only one straight portion. The two helices may be replaced by a guiding path having other geometrical configurations provided that its displacement is gradual.

The above described pulse generator may be used as a limit switch, for example to stop the movement of the mobile arms of a regulating switch for a transformer. It may also be used as a revolution counter for a chain wheel. When the chain wheel is stopped after a certain number of turns, the wheel may oscillate around its rest position and may even rotate almost a full turn backward, which may happen if the chain is too slack, and the pulse generator will not generate an additional pulse.

Figure 4:
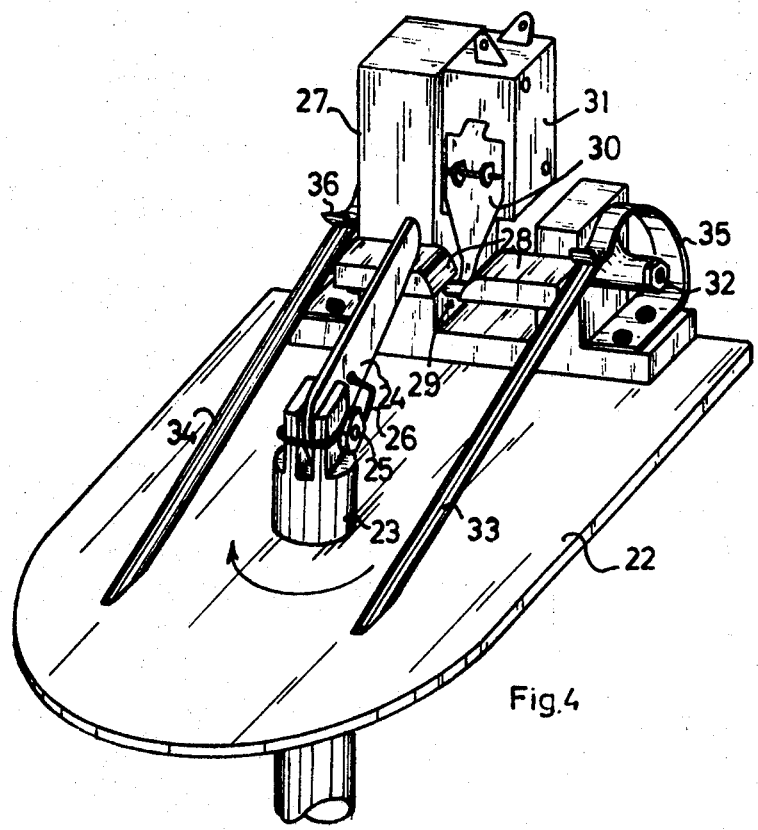
FIG. 4 illustrates a second embodiment of the invention.

FIG. 4 illustrates in a perspective view, as a second embodiment of the invention, a rotary limit switch provided for a regulating switch for a transformer not shown and comprising a support 22 through which protrude an arbor 23 operated by a mechanism including an electric motor the energization of which must be stopped when arbor 23 has rotated a full turn. The motor is usually energized through thyristors which operate as electronic switches and may be opened or closed by the opening or the closure, during a short interval, of contacts operating on the control circuits of the thyristors. At the end of arbor 23 is positioned a finger 24 rotatable around an axis 25 and biased towards arbor 23 by spring 26. On support 22 is secured a contact holding device 27 having a portion 28 overhanging support 22. This portion 28 has a slot 29 in which is positioned member 30 which operates quick brake switch 31. The contact holding portion 27 is provided on both sides of portion 28 with shafts 32 around which may pivot rods 33 and 34 whose ends bear against support 22 under the action of springs 35 and 36.

In the position illustrated in the drawing, the arbor rotating in the direction indicated by the arrow, finger 24, when arriving in alignment with slot 29 whose edges are rounded, falls in slot 29 and operates member 30 which in turn operates switch 31 for a very short time period but sufficiently long however to stop the mechanism. Finger 24 is, at this time, directed towards the surface of support 22. If it is desired to further operate the regulating switch in the same direction, the motor is reoperated. Finger 24 continues to rotate, its end remaining in contact with the surface of support 22. When it contacts rod 33, the rod is raised and falls back after finger 24 has gone by. However, when finger 24 reaches rod 34, it slides thereon and lands on piece 28 to take the position illustrated in the drawing and finally the mechanism is stopped as disclosed earlier. The mechanism being stopped, if it is desired to go backward, the motor is reversed and finger 24 rotates in a direction opposite to the arrow, passes underneath rod 34 raising it, slides on rod 33 and finally falls in slot 29 operating the stopping contact. Consequently, the mechanism may rotate a full turn backward as well as forward and it is the same contact which causes the stopping of the motor in both directions. It is seen that once the fall of finger 24 in slot 29 is initiated, such fall may not be stopped and the opening (or the closure) of the contacts of interruptor 31 always last the same amount of time whatever the speed of rotation of arbor 23 may be.

It is to be understood that other embodiments may be envisaged without departing from the scope of the invention.

I claim:
1. A rotary pulse generator comprising:
 (a) a position index member;
 (b) a second member responsive to the passing of said index member, said members being movable with respect to each other about an axis of rotation;
 (c) a first guide means for gradually displacing said index member axially with respect to second member upon rotation of the index member;
 (d) a second guide means for axially moving said index member when said index member has been rotated a predetermined number of degrees to actuate said second member.
2. A rotary pulse generator comprising:
 (a) a position index member;
 (b) a second member responsive to the passing of said index member, said members being movable with respect to each other about an axis of rotation;
 (c) a slot in the shape of an helix located on one of said members and a pin located on the other member, said pin sliding in said slot when said members are moved with respect to each other;
 (d) a second axial slot located on said one member in communication with said first slot, said pin being adapted to slide in said axial slot when said members have rotated a predetermined number of degrees with respect to each other to actuate said second member.
3. A rotary pulse generator as defined in claim 2, wherein said second member has a contact thereon and wherein said position index member carries a projection adapted to operate said contact when said pin slides in said axial slot.
4. A rotary pulse generator as defined in claim 2, wherein said slots are located on said positioning index member and said pin is located on the second member.
5. A rotary pulse generator as defined in claim 2 further including a spring which is compressed when said members are rotated with respect to each other and moves the index member in the axial direction when said members have rotated said predetermined number of degrees.
6. A rotary pulse generator comprising:
 (a) a support member through which protrudes perpendicularly a rotatable arbor;
 (b) an index member secured to the end of said arbor and biassed towards said support;
 (c) a contact holding member secured to said support, said contact holding member having a portion overhanging said support and a slot parallel to the axis of said arbor;
 (d) an interruptor secured to said contact holding member, said interruptor having an operating member located in said slot;
 (e) two rods located one on each side of said slot, one end of each rod being rotatably mounted on said contact holding member and the other end thereof being biassed towards said support, said rods being positioned in such a way that during the rotation of said arbor the index member passes underneath one of said rods and slides up the other onto the overhanging portion of said contact holding member and falls in the slot in said overhanging member to operate said interruptor.
7. A rotary pulse generator as defined in claim 5, wherein each of said rods is biassed towards said support by means of a spring.
8. A rotary pulse generator as defined in claim 5, wherein said index member is biassed towards said support by means of a spring.

References Cited

UNITED STATES PATENTS 2,882,045 4/1959 Moore _____ 200—153 X
2,960,580 11/1960 Aguillon _____ 200—153 X
3,446,923 5/1969 Voland et al.

ROBERT K. SCHAEFER, Primary Examiner

T. B. JOIKE, Assistant Examiner